United States Patent [19]  [11] 4,292,337
Andersen  [45] Sep. 29, 1981

[54] SUGAR-FREE CONFECTIONERY MATERIAL BASED ON XYLITOL AND SORBITOL

[75] Inventor: Geert Andersen, Halle, Fed. Rep. of Germany

[73] Assignee: August Storck KG, Halle, Fed. Rep. of Germany

[21] Appl. No.: 133,781

[22] Filed: Mar. 25, 1980

[30] Foreign Application Priority Data

Mar. 29, 1979 [DE] Fed. Rep. of Germany ....... 2912411

[51] Int. Cl.$^3$ ............................................. A23G 3/00
[52] U.S. Cl. ..................................... 426/573; 426/575; 426/576; 426/660; 426/804
[58] Field of Search ............... 426/804, 573, 575, 660, 426/576

[56] References Cited

U.S. PATENT DOCUMENTS

| | | | |
|---|---|---|---|
| 3,294,544 | 12/1966 | Stanko | 426/660 |
| 3,371,626 | 3/1968 | Hachtman | 426/804 |
| 3,737,322 | 6/1973 | Frey | 426/804 |
| 3,738,843 | 6/1973 | Frey | 426/804 |
| 3,738,845 | 6/1973 | Liebraud | 426/804 |
| 3,800,045 | 3/1974 | Brucher | 426/660 |
| 3,809,756 | 3/1974 | Bush et al. | 426/660 |
| 3,867,560 | 2/1975 | Menzi | 426/804 |
| 3,914,434 | 10/1975 | Bohni | 426/804 |
| 3,998,976 | 12/1976 | Pernod | 426/804 |
| 4,105,801 | 8/1978 | Dogliotti | 426/804 |
| 4,154,867 | 5/1979 | Aldrich | 426/804 |

*Primary Examiner*—Jeanette M. Hunter
*Attorney, Agent, or Firm*—Murray and Whisenhunt

[57] ABSTRACT

Xylitol and sorbitol, when present in edible material, have the advantage that they do not decompose to form products attacking the dental enamel, but difficulty has been experienced in their use in confectionery material due to their instability or the fact that they may contain constituents not permitted by food laws. The invention provides a chewy sugar-free material based on sorbitol and a sugar-free swelling agent which has the required plasticity and cohesion so that it can be formed into attractive chewy sweets or hard sweets or gum, and furthermore the tendency of xylitol to recrystallize is suppressed, by the use of a swelling agent which may be carrageenates, pectins, agar, alginates such as sodium alginate or potassium alginate or calcuim alginate; carob bean flour, tragacanth, methyl cellulose, carboxymethyl cellulose, gelatine, gum arabic and/or low-sugar maltodextrin.

2 Claims, No Drawings

SUGAR-FREE CONFECTIONERY MATERIAL BASED ON XYLITOL AND SORBITOL

The invention relates to a chewy sugar-free confectionary material based on sorbitol and a sugar-free swelling agent and a method for the production thereof.

It is known that food, luxury articles and drugs containing a high content of sugar, more particularly saccharose, fructose and dextrose, may attack the dental enamel as a result of acid being formed in the mouth by certain bacteria if the teeth are not cleaned properly. There is thus a progressively increasing world demand for sugar-free sweets.

Large-scale attempts have already been made to produce sugar-free sweets. The usual substances used are sorbitol or xylitol tablets, xylitol chewing-gum, sorbitol melted substances, xylitol recrystallized material or sorbitol jellies or pastilles. Hard sweets can also be manufactured by using hydrogenated starch syrup. These "sugar replacements" have the advantage that they do not decompose to form products attacking the dental enamel as a result of the bacterial flora present in the mouth during metabolism, even if the teeth are not cleaned properly.

It is known also from German Auslegeschrift No. 16 92 763 to combine lactose with sorbitol or mannitol or galactose, add a low frementable hydrolyzed startch, and use the substance to produce sweet foods and luxury articles and medical syrup. According to the aforementioned prior art, lactose has to be used, which has a disadvantage in that it does not dissolve easily in water and may cause indigestion. Furthermore sweet foodstuffs and luxury articles or medical syrups made from the aforementioned sugar combination are not sufficiently sweet, so that artificial sweeteners must be added. These present a serious disadvantage since they have an unpleasant, long-lasting after-taste, do not give the sweetness required for confectionery, and pose problems in food law. It is known also from German Offenlegungsschrift No. 24 09 107 to produce sugar-free hard confectionery based on sorbitol or a mixture of sorbitol and mannitol. In order to form a clear, hard product, it is necessary to carry out a complicated sequence of processes under exact conditions.

German Offenlegungsschrift No. 26 59 424 describes chewing-gum sweetened with sugar and containing up to 50 wt.% xylitol in order to improve its storage life. The last-mentioned document states that U.S. Pat. No. 3,899,593 describes a sugar-free chewing-gum containing a larger proportion of xylitol and in which 50–$\alpha$wt.% of the total gum is of xylitol.

The German Dental Magazine 26 (1971), Part 11, page 1088, describes gum confectionery based on gum arabic or agar, in which sorbitol is the only sweetener.

German Offenlegungsschrift No. 28 53 602 describes sugar-free hard sweets which can consist of sorbitol, xylitol, malic acid and a hydrogenated hydrolyzed starch.

Great Britian Pat. No. 1,526,020 describes a compressed product in the form of a tablet, which can contain xylitol and a polyhydric alcohol, such as mannitol and/or sorbitol. These compressed xylitol substances, which do not contain the components in a homogenous form because of their preparation starting with a powder mixture, are not glassy, chewy, sugar-free sweets, which can be processed by the normal methods of pressing, casting, rolling and/or cutting out.

Finally, German Offenlegungsschrift No. 27 29 896 discloses a method of producing hard caramels from xylitol, wherein powdered xylitol is added to melted xylitol at a temperature not greater than the melting point of xylitol. Up to 10 wt.% sorbitol can also be added to the melt. The last-mentioned method, however, likewise gives only hard-brittle, polycrystalline, anhydrous products, which do not have a permanently glassy, chewy structure as required in the production of sweets.

However, all the sugar substituents used in the prior art for producing sugar-free or low-sugar confectionery have a disadvantage that they can be processed only in the form of tablets, melts or solid crystal dispersions or worked into chewing-gum. For example, xylitol crystallizes very easily and does not form a permanent glassy structure, as desired in the production of sweets. Sorbitol by itself is not sweet enough and has a burning, insipid taste, and is thus unsuitable for the production of sweets. Another disadvantage of sorbitol is that it is hygroscopic and the resulting confectionery may become moist, sticky and greasy, which is likewise to be avoided.

Accordingly xylitol, in contrast to sorbitol, has adequate sweetness but cannot be added in the desired manner, like the conventionally-used saccharose, in the production of sweets. The known products thus have serious disadvantages in that they are either not sweet enough or the starting materials are too expensive, or they do not have the desired chewy consistency, or they are not sufficiently stable in storage or contain constituents not permitted by the food laws.

An object of the invention, therefore, is to produce a sugar-free confectionery material suitable, for example for producing sweets, which can be produced from permitted raw materials and processed by simple, conventional methods, giving a sugar-free product.

It has now been surprisingly found that by means of certain sugar-free swelling agents, it is possible to produce sugar-free confectionery material based on sorbitol and a sugar-free swelling agent and having the required plasticity and cohesion. The resulting material can be formed into a sugar-free, attractive, chewy sweet, more particularly hard sweets or gum. An unexpected feature is that, as a result, the strong tendency of xylitol to recrystallize is suppressed and the product can be solidified into a glassy melt such as a hard sweet, and can be stamped, cast, rolled and/or cut out.

The invention therefore provides a sugar-free confectionery material based on sorbitol and a sugar-free swelling agent, characterized in that it contains about 20 to 50 wt.% of a carrageenate, a pectin, agar, an alginate, carob bean flour, tragacanth, methyl cellulose, carboxymethyl cellulose, gelatine, gum arabic and/or low-sugar maltodextrin as sugar-free swelling agent, about 20 to 35 wt.% xylitol, about 0.5 to 3 wt.% water, and about 0.1 to 5 wt.% of one or more conventional aromatic substances, flavourings, acids and/or dyes, the remainder being sorbitol.

Thus according to the invention, the swelling agent may be carrgeenates, pectins, agar, alginates such as sodium alginate or potassium alginate or calcium alginate; carob bean flour, tragacanth, methyl cellulose, carboxymethyl cellulose, gelatine, gum arabic and/or low-sugar maltodextrin, the latter preferably having a dextrose equivalent of 1–10, more particularly 3–5, so that it can be regarded as sugar-free from the standpoint of food legislation.

The sugar-free confectionery material according to the invention can contain one or more of the aforementioned sugar-free swelling agents.

Preferably the sugar-free swelling agent or agents are present in a total proportion of about 40 wt.% (calculated as dry substance).

The other sugar-free swelling agents used according to the invention are well-known to the skilled addressee and therefore need not be described in detail.

The invention also relates to a method or producing the claimed sugar-free confectionery material, wherein at least one sugar-free swelling agent is dissolved with xylitol and sorbitol in water, which can easily be done, forming a clear solution; the resulting material is boiled to the consistency required for further treatment and to a residual water content of 0.5 to 3 wt.% after which the desired aromatic substances, flavourings, acids and/or dyes are introduced or formed in the material, if desired.

The claimed confectionery material can be used for producing any required confectionery, for example filled or unfilled hard and soft caramels, or sweets, foamed confectionery, gum confectionery, liquorice, sugar-coated pills, pastilles, etc., and particularly chewy sweets.

The invention, therefore, also relates to the use of the confectionery material in the production of sugar-free confectionery, more particularly chewy sweets.

Accordingly, the invention provides a product which is sugar-free and/or has reduced calories and can be formed into a glassy, chewy, sugar-free sweet.

What is claimed is:

1. Chewy sugar-free confectionery material comprising,
    about 20 to 50 wt.% of a sugar-free swelling agent selected from the group consisting of a carrageenate, a pectin, agar, an alginate, carob bean flour, tragacanth, methyl cellulose, carboxymethyl cellulose, gelatine, gum arabic and low-sugar maltodextrin,
    about 20 to 35 wt.% xylitol;
    about 0.5 to 3 wt.% water, and
    about 0.1 to 5 wt.% of one or more additives selected from the groups consisting of aromatic substances, flavoring, acids and dyes,
    the remainder being sorbitol.

2. A method of producing the material according to claim 1, comprising dissolving in water the xylitol, sorbitol and the sugar-free swelling agent and boiling the solution to a residual water content of 0.5 to 3 wt.% after which desired aromatic substances, flavourings, acids and/or dyes are added or produced in the material.

* * * * *